(12) United States Patent
Garimella et al.

(10) Patent No.: US 9,059,939 B2
(45) Date of Patent: Jun. 16, 2015

(54) END-TO-END NETWORK SERVICE ASSURANCE SOLUTION

(75) Inventors: Krishna Ghaitanya Garimella, Hyderabad (IN); Ashit Mahendra Shetty, Bangalore (IN); Gaurav Saxena, Bangalore (IN); Kishore Babu Thota, Gutur (IN); Sanjay Ravindra Ranade, Pune (IN)

(73) Assignee: Infosys Limited, Bangalore (IN)

( * ) Notice: Subject to any disclaimer, the term of this patent is extended or adjusted under 35 U.S.C. 154(b) by 236 days.

(21) Appl. No.: 13/524,932

(22) Filed: Jun. 15, 2012

(65) Prior Publication Data
US 2013/0227103 A1    Aug. 29, 2013

(30) Foreign Application Priority Data

Feb. 23, 2012    (IN) .............................. 672/CHE/2012

(51) Int. Cl.
*G06F 15/16*    (2006.01)
*H04L 12/24*    (2006.01)

(52) U.S. Cl.
CPC ........... *H04L 41/5054* (2013.01); *H04L 41/142* (2013.01); *H04L 41/5074* (2013.01); *H04L 41/147* (2013.01); *H04L 41/0677* (2013.01); *H04L 41/0631* (2013.01); *H04L 41/0663* (2013.01); *H04L 41/0672* (2013.01); *H04L 41/12* (2013.01); *H04L 41/0206* (2013.01)

(58) Field of Classification Search
CPC ............................ H04L 41/5003; H04L 43/00
USPC .......... 709/203, 217, 219, 223, 249; 717/100, 717/104; 714/2
See application file for complete search history.

(56) References Cited

U.S. PATENT DOCUMENTS

| 6,449,588 | B1 | 9/2002 | Bowman-Amuah |
| 6,611,867 | B1 * | 8/2003 | Bowman-Amuah .......... 709/224 |
| 7,392,046 | B2 | 6/2008 | Leib et al. |
| 7,523,041 | B2 | 4/2009 | Chen et al. |
| 7,987,228 | B2 | 7/2011 | McKeown et al. |
| 2002/0111755 | A1 | 8/2002 | Valadarsky et al. |
| 2004/0030627 | A1 * | 2/2004 | Sedukhin ........................ 705/36 |

(Continued)

OTHER PUBLICATIONS

Air Defense Network Assurance Solutions, Motorla Solutions, http://www.motorola.com/Business/US-EN/Business+Product+and+Services/Software+and+Applications/WLAN+Management+and+Security+Software/AirDefense+Network+Assurance+Solutions, downloaded Dec. 27, 2011, 2 pages.

(Continued)

*Primary Examiner* — Frantz Jean
(74) *Attorney, Agent, or Firm* — Klarquist Sparkman, LLP

(57) ABSTRACT

Disclosed herein are representative embodiments of tools and techniques for providing network service assurance. One exemplary embodiment includes a framework for network service assurance that includes a presentation layer, a service management layer, a network-infrastructure management layer, and a unified network-access layer. The unified-network-access layer is configured to receive a network request in a standard abstracted format, the network request being associated with at least one network element. The unified network-access layer also being configured to select a vendor adaptor from a plurality of vendor adaptors based on an element type of the at least one network element. The unified network-access layer further being configured to generate a vendor-formatted network request using the vendor adapter, and configured to send the vendor-formatted network request to the at least one network element.

20 Claims, 9 Drawing Sheets

(56) References Cited

U.S. PATENT DOCUMENTS

| | | | | |
|---|---|---|---|---|
| 2005/0015771 | A1* | 1/2005 | Bagsby | 718/106 |
| 2006/0106945 | A1* | 5/2006 | Westervelt et al. | 709/246 |
| 2007/0150480 | A1* | 6/2007 | Hwang et al. | 707/10 |
| 2008/0010481 | A1* | 1/2008 | Anantharamaiah et al. | 714/2 |
| 2008/0114799 | A1* | 5/2008 | Chasen | 707/101 |

OTHER PUBLICATIONS

Telecom Network Assurance, Service Assurance & Remote Test/Monitoring Systems, http://www.marketresearch.com/Dittberner-Associates-v3017/Telecom-Network-Assurance-Service-Remote-1351633/, downloaded on Dec. 27, 2011, 3 pages.

Traffic Analysis and Monitoring System (TAMS) for Multi-Protocol Environments, http://accantosystems.com/products/network-monitors/tams, downloaded Dec. 27, 2011, 3 pages.

Netrac Fault Management, http://www.slideshare.net/pereirik/netrac-fault-management-solution, 8 pages, downloaded Jun. 12, 2012.

Netrac Performance Management, http://www.slideshare.net/pereirik/netrac-performance-management-solution, 8 pages, downloaded Jun. 12, 2012.

TTI Telecom, NetracXpress, http://www.elkotek.com.tr/userfiles/file/Omurga/Management/xpress_pdf_final.pdf, 6 pages, downloaded Jun. 12, 2012.

Netrac OSS/BSS Suite of Products, http://www.pipelinepub.com/pdfs/tti_product.pdf, 8 pages, downloaded Jun. 12, 2012.

TTI Telecom, Netrac Performance Management, http://www.elkotek.com.tr/userfiles/file/Omurga/Management/Performance_PDF.pdf, 8 pages, downloaded Jun. 12, 2012.

TTI Telecom—Netrac Service Management, http://web.archive.org/web/20100612185220/http://www.tti-telecom.com/products/netrac-service-management, 7 pages, archived Jun. 12, 2010.

TTI Telecom—ServiceImpact, http://web.archive.org/web/20100808093108/http://www.tti-telecom.com/products/serviceimpact, 6 pages, archived Aug. 8, 2010.

MYCOM, "NIMS PrOptima™" http://www.mycom-int.com/section/128/4, 9 pages, MYCOM 2012, downloaded Jun. 13, 2012.

RADCOM, "Omni-Q for Service Assurance," 4 pages, downloaded Jun. 13, 2012.

RADCOM, "Why You Need Service Assurance Applications," White Paper, 19 pages, Nov. 2009.

RADCOM, "Omni-Q Service Assurance Solution," http://www.radcom.com/omni-q-service-assurance-solution, 2 pages, accessed Jun. 13, 2012.

RADCOM, "QExpert—A Fascinating World of Reports," http://www.radcom.com/qexpert-fascinating-world-reports, 2 pages, accessed Jun. 13, 2012.

RADCOM, "QAlarm—Massive KPI Alarms," http://www.radcom.com/qalarm-massive-kpi-alarms, 2 pages, accessed Jun. 13, 2012.

RADCOM, "QMyNetwork—Network Elements and Links Analytics," http://www.radcom.com/Network_Elements_and_Links, 2 pages, accessed Jun. 13, 2012.

RADCOM, "QTrace—Online Call Troubleshooting," http://www.radcom.com/qtrace-online-call-troubleshooting, 2 pages, accessed Jun. 13, 2012.

RADCOM, "QAssure—Fraud Detection and Prevention," http://www.radcom.qassure-fraud-detectino-and-prevention, 2 pages, accessed Jun. 13, 2012.

RADCOM, "QRoam—Roaming Quality," http://www.radcom.qroam-roaming-quality, 2 pages, accessed Jun. 13, 2012.

RADCOM, "QConnect—Interconnection Link Quality,"http://www.radcom.qconnect-interconnection-link-quality, 2 pages, accessed Jun. 13, 2012.

RADCOM, "Omni-Q Customer Experience Management," http://www.radcom.com/omni-q-customer-experience-management, 2 pages, accessed Jun. 13, 2012.

RADCOM, "QVIP—SLA for Subscriber Groups," http://www.radcom.com/qvip-sla-subscriber-groups, 2 pages, accessed Jun. 13, 2012.

RADCOM, "QiCare Customer Care," http://www.radcom.com/qicare-customer-care, 2 pages, accessed Jun. 13, 2012.

RADCOM, "Smartphone Service Optimization," http://www.radcom.com/smartphone-service-optimization, 2 pages, accessed Jun. 13, 2012.

RADCOM, "QMyHandset—Benchmarking Handset and Data-card Models," http://www.radcom.com/qmyhandset-benchmarking-handset-and-data-card-models, 2 pages, accessed Jun. 13, 2012.

RADCOM, "RANalysis Radio Optimization: UMTS Radio Analyzer," http://www.radcom.com/UMTS_Radio_Analyzer, 2 pages, accessed Jun. 13, 2012.

RADCOM, "UMTS Analyzer—UMTS Consultant," http://www.radcom.com/umts-analyzer-umts-consultant, 2 pages, accessed Jun. 13, 2012.

RADCOM, "VoIP Performer—Analysis and Testing," http://www.radcom.com/voip-performer-anlaysis-and-testing, 2 pages, accessed Jun. 13, 2012.

TEOCO, "Guardian," http://www.teoco.com/products/guardian, 3 pages, accessed Jun. 13, 2012.

TEOCO, "Margin Assurance," http://www.teoco.com/products/revenue-management--margin-assurance, 3 pages, accessed Jun. 13, 2012.

TEOCO, "MVNO Reconciliation," http://www.teoco.com/products/mvno-reconciliation, 3 pages, accessed Jun. 13, 2012.

TEOCO, "Netrac Performance Management," http://www.teoco.com/products/netrac-performance-management, 4 pages, accessed Jun. 13, 2012.

TEOCO, "Netrac PMM," http://www.teoco.com/productsnetrac-pmm, 3 pages, accessed Jun. 13, 2012.

TEOCO, "Revenue Management," http://www.teoco.com/products/revenue-management, 3 pages, accessed Jun. 13, 2012.

TEOCO, "Roaming Analytics," http://www.teoco.com/products/roaming-analytics, 3 pages, accessed Jun. 13, 2012.

TEOCO, "Roaming Reconciliation," http://www.teoco.com/products/roaming-reconciliation, 3 pages, accessed Jun. 13, 2012.

TEOCO, "Service Assurance," http://www.teoco.com/products/service-assurance, 3 pages, accessed Jun. 13, 2012.

TEOCO, "Service Impact," http://www.teoco.com/products/service-impact, 3 pages, accessed Jun. 13, 2012.

TEOCO, "Netrac Service Management," http://www.teoco.com/products/service-management, 4 pages, accessed Jun. 13, 2012.

TEOCO, "Service Quality Center," http://www.teoco.com/products/service-quality-center, 3 pages, accessed Jun. 13, 2012.

TEOCO, "Switch to Bill Reconciliation," http://www.teoco.com/products/switch-to-bill-reconciliation, 1 page, accessed Jun. 13, 2012.

TEOCO, "Switch to Invoice Reconciliation," http://www.teoco.com/products/switch-to-invoice-reconciliation, 3 pages, accessed Jun. 13, 2012.

TEOCO, "Traffic Costing," http://www.teoco.com/products/traffic-costing, 3 pages, accessed Jun. 13, 2012.

TEOCO, "TrafficGuard," http://www.teoco.com/products/trafficguard, 3 pages, accessed Jun. 13, 2012.

TEOCO, "Netrac RTM," http://www.teoco.com/products/netrac-rtm, 3 pages, accessed Jun. 13, 2012.

TEOCO, "PMM Reporter," http://www.teoco.com/products/pmm-reporter, 3 pages, accessed Jun. 13, 2012.

TEOCO, "Netrac Fault Management," http://www.teoco.com/products/netrac-fault-mangement, 4 pages, accessed Jun. 13, 2012.

TEOCO, "Netrac FaM Cruiser," http://www.teoco.com/products/netrac-fam-cruiser, 3 pages, accessed Jun. 13, 2012.

TEOCO, "Correlator TRS," http://www.teoco.com/products/correlator-trs, 3 pages, accessed Jun. 13, 2012.

TEOCO, "NeTKT," http://www.teoco.com/products/netkt, 3 pages, accessed Jun. 13, 2012.

TEOCO, "FaM Reporter," http://www.teoco.com/products/fam-reporter, 3 pages, accessed Jun. 13, 2012.

TEOCO, "Netrac Framework," http://www.teoco.com/products/netrac-framework, 3 pages, accessed Jun. 13, 2012.

TEOCO, "Netrac Framework," http://www.teoco.com/products/netrac-framework---bc, 5 pages, accessed Jun. 13, 2012.

TEOCO, "Netrac Mediation," http://www.teoco.com/products/netrac-mediation, 3 pages, accessed Jun. 13, 2012.

(56) References Cited

OTHER PUBLICATIONS

TEOCO, "Netrac Studio," http://www.teoco.com/products/netrac-studio, 5 pages, accessed Jun. 13, 2012.
TEOCO, "Netrac API," http://www.teoco.com/products/netrac-api, 3 pages, accessed Jun. 13, 2012.
TEOCO, "Netrac Provisioning," http://www.teoco.com/products/netrac-provisioning, 3 pages, accessed Jun. 13, 2012.
TEOCO, "Interconnect Partner Billing and Settlement," http://www.teoco.com/products/interconnect-partner-billing-and-settlement, 3 pages, accessed Jun. 13, 2012.
TEOCO, "Routing Optimization," http://www.teoco.com/products/routing-optimization, 3 pages, accessed Jun. 13, 2012.
TEOCO, "Acuité," http://www.teoco.com/products/acuite, 4 pages, accessed Jun. 13, 2012.
TEOCO, "INroute," http://www.teoco.com/products/inroute, 3 pages, accessed Jun. 13, 2012.
TEOCO, "AcuWorld," http://www.teoco.com/products/acuworld, 4 pages, accessed Jun. 13, 2012.
TEOCO, "AcuPrice," http://www.teoco.com/products/acuprice, 4 pages, accessed Jun. 13, 2012.
TEOCO, "Margin Assurance," http://www.teoco.com/products/margin-assurance, 3 pages, accessed Jun. 13, 2012.
TEOCO, "Activate," http://www.teoco.com/products/activate, 3 pages, accessed Jun. 13, 2012.
TEOCO, "NetOrder," http://www.teoco.com/products/netorder, 3 pages, accessed Jun. 13, 2012.
TEOCO, "NetTask," http://www.teoco.com/products/nettask, 3 pages, accessed Jun. 13, 2012.
TEOCO, "NetSync," http://www.teoco.com/products/netsync, 3 pages, accessed Jun. 13, 2012.
TEOCO, "Customer Analytics," http://www.teoco.com/products/customer-analytics, 3 pages, accessed Jun. 13, 2012.
TEOCO, "Behavioral Analytics," http://www.teoco.com/products/behavioral-analytics, 3 pages, accessed Jun. 13, 2012.
TEOCO, "Profitability Analytics," http://www.teoco.com/products/profitability-analytics, 3 pages, accessed Jun. 13, 2012.
TEOCO, "Quality of Experience Analytics," http://www.teoco.com/products/quality-of-experience-analytics, 3 pages, accessed Jun. 13, 2012.
TEOCO, "Cost Management," http://www.teoco.com/products/cost-management, 3 pages, accessed Jun. 13, 2012.
TEOCO, "BillTrak Suite," http://www.teoco.com/products/billtrak-suite, 3 pages, accessed Jun. 13, 2012.
TEOCO, "ViewLogic," http://www.teoco.com/products/view-logic, 4 pages, accessed Jun. 13, 2012.

\* cited by examiner

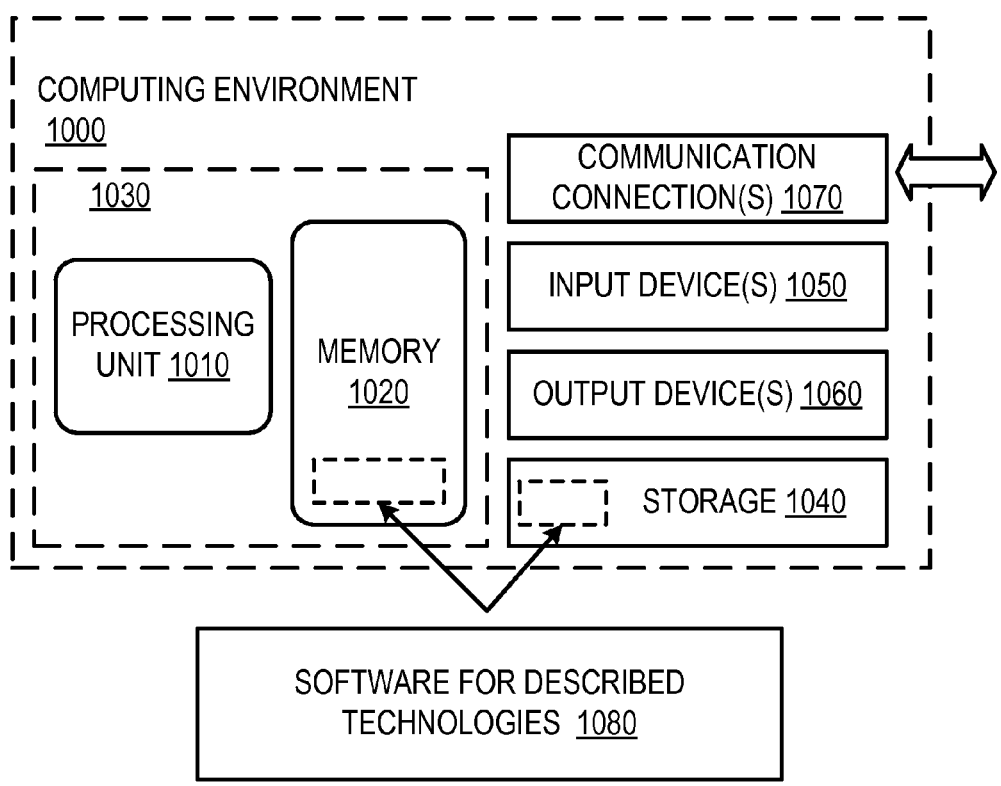

END-TO-END NETWORK SERVICE ASSURANCE SOLUTION

FIELD

The field relates to network service assurance, and, in particular, to an integrated end-to-end framework for network service assurance.

BACKGROUND

As the number of available telecommunication services have grown in today's world, telecommunication service providers have expanded communications networks with more technologies to provide more services. The complexity of these communications networks can escalate as services and technologies are added. Although, traditional network technologies can be used to monitor aspects of communications networks, traditional technologies are limited.

SUMMARY

In summary, among other innovations, techniques and tools are described herein for network service assurance. According to one aspect of the tools and techniques described herein, an integrated end-to-end framework for network service assurance includes a presentation layer, a service management layer, a network-infrastructure management layer, and a unified network-access layer. The unified-network-access layer is configured to receive a network request in a standard abstracted format, and the network request being associated with at least one network element. The unified network-access layer also being configured to select a vendor adaptor from a plurality of vendor adaptors based at least on information about the at least one network element. The unified network-access layer further being configured to generate a vendor-formatted network request using the vendor adapter, and also configured to send the vendor-formatted network request to the at least one network element.

The foregoing and other objects, features, and advantages of the invention will become more apparent from the following detailed description, which proceeds with reference to the accompanying figures.

BRIEF DESCRIPTION OF THE DRAWINGS

FIG. 10 is a schematic diagram illustrating a generalized example of a suitable computing environment for any of the disclosed embodiments.

DETAILED DESCRIPTION

Exemplary Integrated End-to-End Framework for Network Service Assurance

Figure 1:
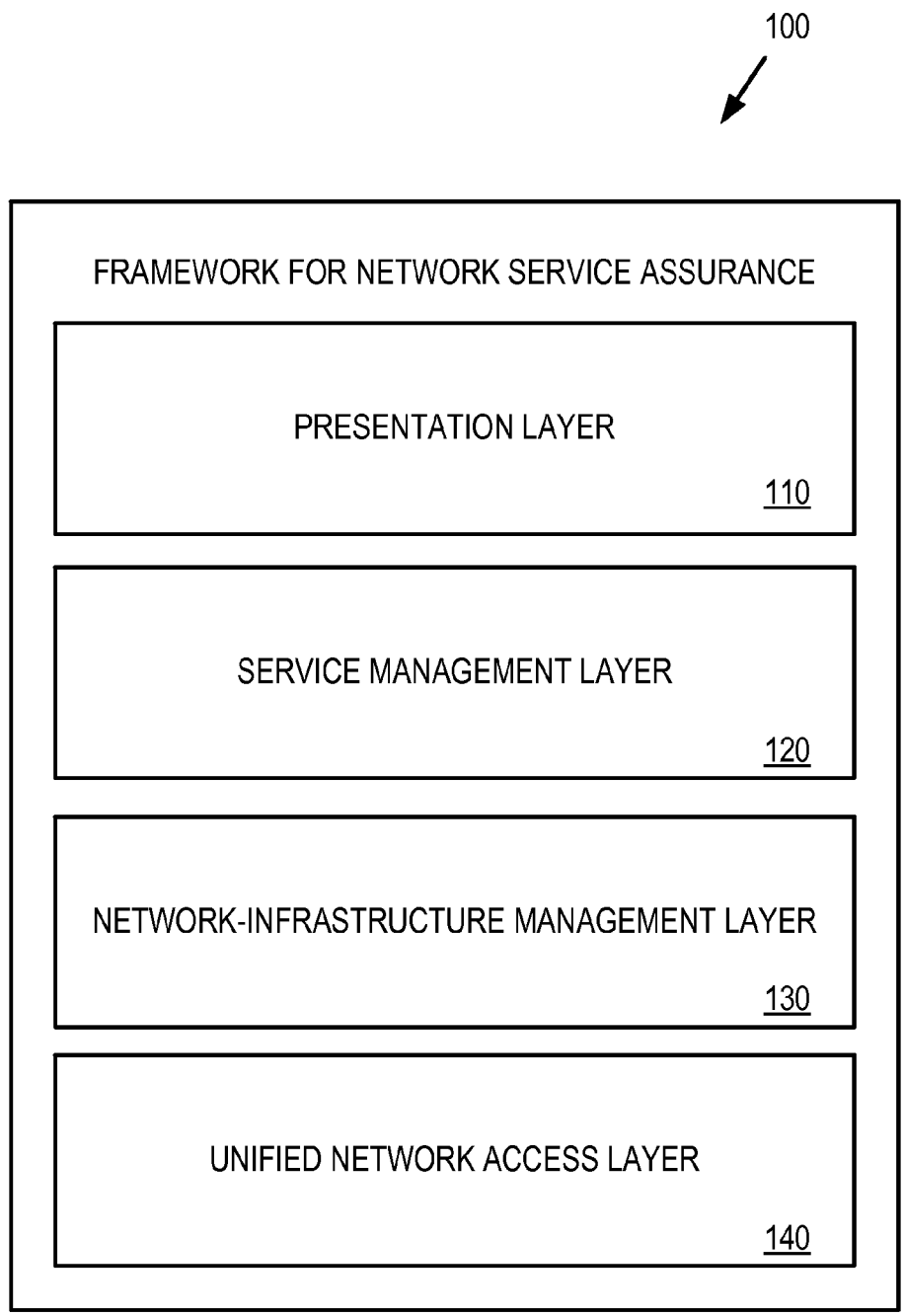
FIG. 1 is a schematic diagram of an exemplary framework for network service assurance.

FIG. 1 is a schematic diagram of an exemplary framework 100 for network service assurance that can be implemented using one or more computing devices.

The framework 100 can be an integrated end-to-end framework for network service assurance that has the capability to cover many aspects (e.g., one, more than one, or all aspects) of network service assurance in a reactive mode and/or proactive mode for voice, video, and/or data technologies provided by communications service providers. The framework 100 can be end-to-end, flexible, and open, and provide network service assurance using proactive and reactive network fault detection across hybrid networks and services. In some implementations, the hybrid networks include wire line networks such as next generation wire line complex networks. In some implementations, communications service providers can include retail broadband service providers, wholesale broadband service providers, local access providers, carrier Ethernet service providers, voice service providers, and television service providers. In some implementations, wire line network services can include Ethernet services, broadband services, virtual private network (VPN) services, and other wire line services. The framework 100 can perform automatic network fault detection, network fault co-relation, and/or trend based performance analysis for network fault localization to provide solutions to problems on voice, data, and video services provided by a network. The framework 100 can include and provide an extensible platform for integration with open source, commercial off-the-shelf networking tools and packages, rules engines, legacy systems, and/or other like network systems. The framework 100 can include a presentation layer 110, a service management layer 120, a network-infrastructure management layer 130, and a unified network-access layer 140. The unified network-access layer 140 can integrate with a hybrid heterogeneous network such as a next generation wire line heterogeneous network, and the unified network-access layer can provide capabilities for performing real time diagnostics, managing proactive network events, and integration with customer premises equipment (CPE) devices and third party systems. The service management layer 120 can determine root causes of network service failures, the impact of a network failure on network services and/or recommendations for correcting or repairing the root cause of network service failures. The service management layer 120 can perform actions by using a knowledge based service analytics engine that can recommend resolutions based in part on the type and/or complexity of the network problem or network service failure. For example, if a repair, correction, or resolution of a network service failure can be achieved automatically through configuration on a network device, the service management layer can have a network request, that requests the performance of a repair operation, sent from the network-infrastructure management layer 130 to the unified network-access layer 140. The unified network-access layer 140 can then transform the network request to send a vendor-formatted network request to have the appropriate configuration performed on the appropriate network device. In some implementations, if a resolution, correction, or repair can be done manually, the service management layer creates one or more tickets in one or more trouble ticketing and/or work flow management systems to initiate a manual repair or correction. Network-infrastructure management layer 130 can provide network event correlation, network capacity analytics, and repair procedures for repairing or network failures or faults. Presentation layer 110 can provide a user interface to access the services exposed by a network such as the services of the service management layer 120, the network-infrastructure management layer 130, the unified network-access layer 140, and/or other communications network services.

Exemplary Unified Network-access Layer

Figure 2:
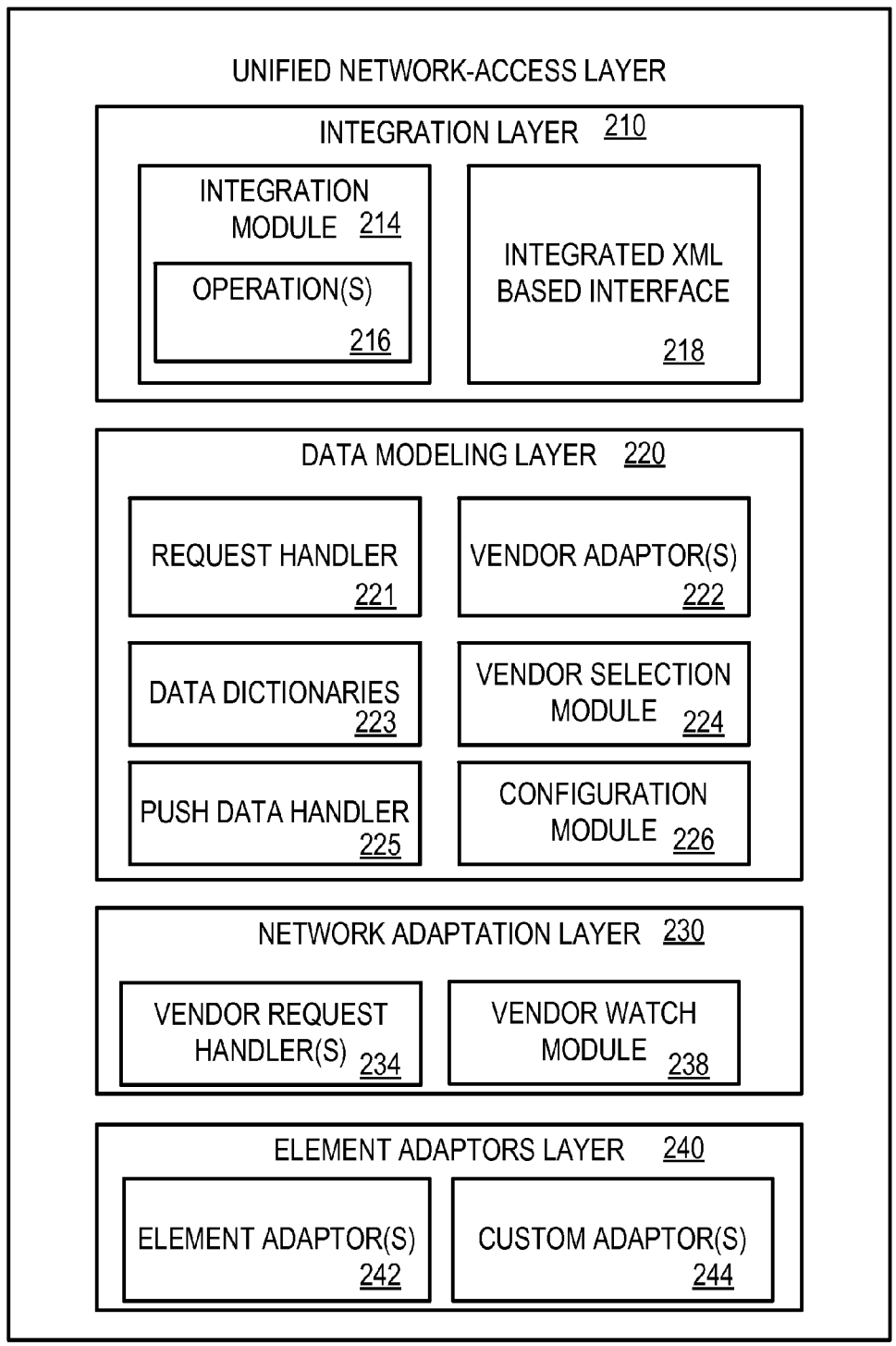
FIG. 2 is a schematic diagram illustrating an exemplary unified network-access layer.

FIG. 2 is a schematic diagram illustrating an exemplary unified network-access layer 200. With rapid advancements in the telecommunications domain, communications service providers can add new networks and expand existing networks with devices and technologies provided by various vendors to support emerging technologies and products. Service assurance including fault management of these multi-vendor, multi-standard, multi-protocol networks can be done in part using a unified network-access layer such as unified network-access layer 200. A unified network-access layer can provide a single platform to interface with multiple devices and/or technologies from multiple vendors. For example, a unified network-access layer can be communicated with by upstream systems (e.g., operational support systems, a service management layer, a network-infrastructure management layer, and/or other upstream system) using an interface compliant with a standard abstracted format, and then the unified network-access layer can interface with downstream network elements and services using vendor-formatted network requests. That is to say a unified network-access layer as an extensible platform can interface with network devices and systems from different vendors that support vendor formats that are compliant with different device or system interface standards or protocols. Device or system interface standards, transport mechanisms, communications patterns (e.g., synchronous and/or asynchronous), and third-party system integrators supported by network elements and network element types can vary based on the vendor that provides or makes the network element. A unified network-access layer such as unified network-access layer 200 can provide a platform to perform fault management on network elements in part by abstracting the underlying complexity of interacting with network elements and/or third party systems using one or more transport mechanisms and protocols in a reactive and/or proactive manner. In some implementations, a unified network-access layer can communicate and integrate with network elements or systems that support vendor formats that are compliant with one or more device or system interface standards or protocols such as one or more Telemanagement Forum (TMF) standards, one or more versions of the Multi-Technology Operations System Interface (MTOSI) standard, the TR-069 standard, one or more transport layer standards, and other like interface standards. A unified network-access layer can support synchronous and/or asynchronous modes of communication. For example, synchronous communication can be used to retrieve a status of a network element on-demand or in real time, and asynchronous communication can be used to gather data sets from network elements periodically over time. In some implementations, the unified network-access layer can be integrated to be used with an existing operational support system (OSS) as a 'plug-N-play' kit. In some implementations, operational support systems can be systems attached to the network to provide operational support for the network. In some implementations, the unified network access layer can support interactions with systems such as OSS systems using XML and can be compliant with one or more versions of the MTOSI standard such as MTOSI 2.0 or other versions. In some implementations, a unified network-access layer can include a graphical user interface that can include one or more management information system options when accessed. The unified network-access layer 200 of FIG. 2 includes an integration layer 210, a data modeling layer 220, a network adaptation layer 230, and an element adaptors layer 240.

The integration layer 210 can be used to integrate the unified network-access layer with upstream services such as one or more OSS systems built on one or more software platforms, and/or a service management layer, a network-infrastructure management layer, and a presentation layer. The integration layer 210 includes an integration module 214 and an integrated extensible markup language (XML) based interface such as integrated XML based interface 218. The integrated XML based interface 218 can be compliant with the MTOSI standard. For example, the integrated XML based interface 218 can be a web service that is MTOSI compliant and/or an integration web service module. In some implementations, the integration layer can communicate or be accessed synchronously or asynchronously using web services, and/or message oriented middlewares such as Java Message Service and the like. The integrated XML based interface 218 can invoke an application programming interface (API) of the integration module 214. For example, the integrated XML based interface can receive a network request from an OSS system or a service management layer requesting the performance of an on-demand diagnostics of one or more network elements or systems, and the integrated XML based interface 218 can invoke an operation of the API of the integration module to have the requested diagnostics performed.

The integration module 214 is an API based integration module that exposes an API to execute one or more operations 216 that allow for operational support system (OSS) integration. In one example, the operations 216 that can be executed using the API exposed by the integration module 214 can include a monitor operation, a notify operation, a collect statistics operation, and an execute operation.

The monitor operation of the integration module 214, in some implementations, allows the unified network-access layer to monitor a network and capture alarms and/or traps from network and/or OSS tools, components and/or devices. In some implementations, the monitor operation allows the unified network-access layer to generate a notification based on a captured alarm and/or trap and the notification includes enriched data with abstracted values. In some implementations, the monitor operation can be used to monitor for and/or collect network performance statistics. In one implementation, the monitor operation is invoked using parameters that can include entity information, properties information, OSS inventory information, or one or more monitor rules. In one implementation, the monitor operation once invoked provides an output that indicates that the outcome of the monitor operation as invoked was successful or unsuccessful.

The notify operation of the integration module 214, in some implementations, is a push operation that allows the unified network-access layer to send a notification to one or more OSS systems. In one implementation, the notification sent by the notify operation can be based on the processing of captured and/or monitored alarms and/or traps from one or more network components (e.g., a device and/or probe) and/or one or more OSS components. In one implementation, the processing of captured and/or monitored alarms and/or traps can be done using one or more monitor rules. In some implementations, the monitor operation once invoked provides output that can include entity information, properties information, property values information, or OSS inventory information.

The collect statistics operation of the integration module 214, in some implementations, is a push operation that sends enriched, abstracted performance statistics to one or more OSS systems after capturing performance data from one or more network components and/or one or more OSS components using one or more monitor rules. In some implementations, the collect statistics operation once invoked provides output that can include entity information, properties information, property values information, or OSS inventory information.

The execute operation of the integration module 214, in some implementations, causes the execution (e.g., a real time execution) of a functionality of one or more network elements. For example, the execute operation can be used to run a diagnostic test on a device and/or test head. Also for example, the execution operation can be used to set a property value or configuration value on a network element. In one implementation, the execute operation is invoked using parameters that can include entity information, properties information, property value information, OSS inventory information, or an operation type information. In some implementations, the operation type information detects the choice of functionality to be executed for a network element.

The data modeling layer 220 of the unified network-access layer 200 can include a request handler 221, a vendor adaptor 222, one or more data dictionaries 223, vendor selection module 224, a push data handler 225, and/or a configuration module 226. In some implementations, the data modeling layer 220 transforms OSS data (e.g., entities information, properties information, values information, and/or other OSS data) in a standard abstracted format into data that is in a vendor format that can be accepted and processed by a network element that is compliant with the vendor format. Also, in some implementations, the data modeling layer transforms data received from a network element that is formatted in a vendor format into a standard abstracted format. In some implementations the data modeling layer 220 uses the one or more data dictionaries 223 to perform the transformation of data from a standard abstracted format to a vendor format or from a vendor format to the standard abstracted format. In some implementations, a data dictionary of the one or more data dictionaries 223 is used for mapping data values of the standard abstracted format to corresponding values of one or more vendor formats. In some implementations, OSS inventory information can be created by the data modeling layer 220 using a standard abstracted format for representing captured network inventory information so that OSS inventory information in the standard abstracted format can be understood by OSS systems when received. In some implementations of a data modeling layer, one or more mapping rules can be used to transform OSS inventory data to vendor inventory data or vendor inventory data to OSS inventory data.

Tables 1-3 show exemplary data dictionaries that can be used by a data modeling layer. These exemplary data dictionaries are provided for explanation and other data dictionaries can also be used by a unified network-access layer.

TABLE 1

Entity Data Dictionary

| Name | Description |
|---|---|
| Device | Physical or logical Device, Probe, or Test Head |
| Device.card | A network card |
| Device.card.port | Port on a device |

TABLE 1-continued

Entity Data Dictionary

| Name | Description |
|---|---|
| Device.card.port.vlanid | VLAN on a port |
| Device.link | Physical/Logical Network connection |
| Device.card.CPU | CPU on Device Card |
| Device.card.port.vlanid.channel | TV Channels |

TABLE 2

Properties Data Dictionary

| Name | Vendor 1 Format | Vendor 2 Format |
|---|---|---|
| System.availability | Availability % | Available |
| System.temperature | Temp | Temperature |
| Ethernet.ingress.packetLoss | InPacketLoss % | iPacketLoss |
| Ethernet.egress.packetLoss | OutPacket:Loss% | ePacketLoss |
| Ethernet.adminState | AdministrativeState | AdminStatus |
| Ethernet.jitters | Jitters | Jitters |
| RTSP.roundTripDelay | Delay% | RstpDelay |

TABLE 3

Properties' Value Data Dictionary

| Name | Vendor 1 Value Format | Vendor 2 Value Format |
|---|---|---|
| Up | Active | 1 |
| Loop | In Loop | 2 |
| Down | Inactive | 0 |

The data modeling layer 220 includes one or more vendor adaptors 222. A vendor adaptor of the one or more vendor adaptors 222 can be selected and invoked for use based on a selected network vendor and a network device that is to be communicated with using the selected vendor adaptor. For example, if a network device is a modem from a vendor, the vendor adaptor that is invoked can be a vendor adaptor that is configured to generate vendor-formatted network requests that can communicate or interface with the modem device from the vendor. In some implementations, a vendor adapter can map an identified device with a device interface standard compliant with the device and generate a vendor-formatted network request so that it is compliant with the device interface standard. Respective vendor adaptors of the one or more vendor adaptors 222 can include vendor request templates and vendor data processing modules. The vendor request templates can be used to generate or build vendor-formatted network requests. In some implementations, the vendor-formatted network requests can be generated using the vendor request templates, entity information and/or operation type information. In some implementations, vendor adaptors can be configured to communicate with devices from vendors that are compliant with one or more versions of the MTOSI standard, and/or the TR-069 standard.

The network adaptation layer 230 of the unified network-access layer 200 can include one or more vendor request handlers 234, and/or one or more vendor watch modules 238. The network adaptation layer can operate reactively in a reactive mode or proactively in proactive mode. For example, in the reactive mode, the request handlers extract on-demand data from network elements or systems. Also for example, in the proactive mode, the vendor watch modules subscribe to alarm and performance parameters related information from network elements or systems and collect the performance parameters related information periodically.

The network element adaptors layer 240 of the unified network-access layer 200 includes one or more element adaptors 242, that are used to communicate with one or more network elements (e.g., devices, EMS, NMS, probes, and/or test heads), and/or one or more custom adaptors 244, that are used to communicate with OSS network facing components or systems such as components that are part of commercial off-the-shelf products provided by vendors or other network facing components. For example, a custom adaptor can be used to connect or plug-in OSS components that already exist on a network so that the OSS components can communicate with the unified network-access layer connected to the network. The element adaptors 242 and custom adaptors 244 can support and communicate with network elements and OSS network facing components using one or more transport mechanisms. In some implementations, an element adaptors layer can use a standard element adaptor or a custom adaptor to interface or communicate with a network element or OSS network facing component using one or more transport mechanisms compliant with the network element or OSS network facing component such as an XML based interface or a conventional remote procedure call (RPC) based interface. In some implementations, an XML based interface can include a SOAP & REST web service, HTTP over XML, JMS using a message provider, or other XML based interfaces. In some implementations, an RPC based interface can include telnet, SSH, Corba, SNMP, ICMP, or other RPC based interfaces. In some implementations, an element adaptors layer can use a standard element adaptor or a custom adaptor to interface or communicate with a network element or OSS network facing component by converting XML to eBXML. For example, when services of a local operator's network are exposed over a business-to-business (B2B) gateway, adaptors can convert from XML to eBXML which can be transported over the gateway.

Figure 3:
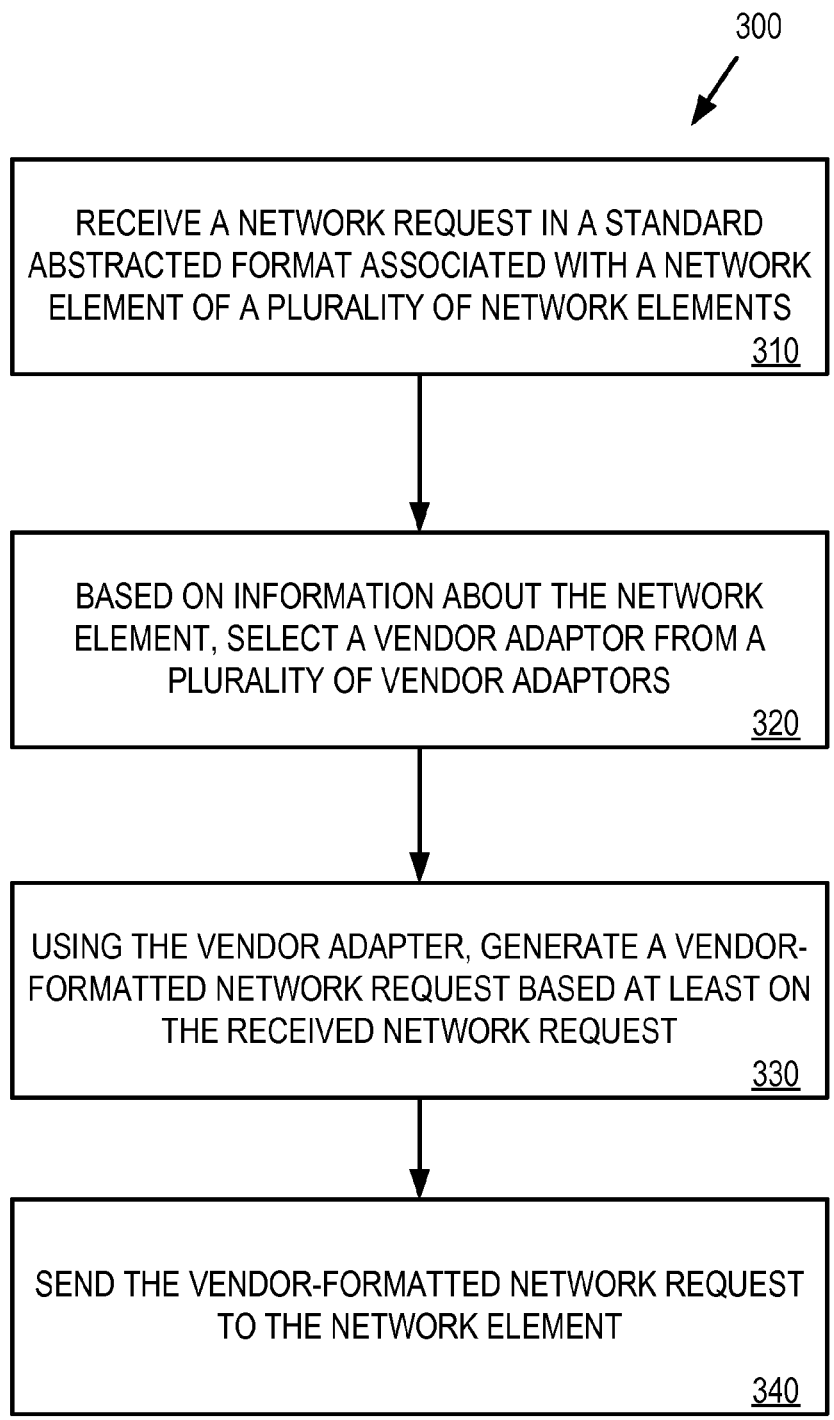
FIG. 3 is a flowchart illustrating an exemplary method for sending a vendor-formatted network request.

Exemplary Method for Sending a Vendor-Formatted Network Request to a Network Element FIG. 3 is a flowchart illustrating an exemplary method 300 for sending a vendor-formatted network request to a network element. In FIG. 3, a network request in a standard abstracted format that is associated with a network element of a plurality of network elements is received at 310. For example, a network request to configure a network device can be sent to and received by a unified network-access layer and the network request can be formatted in a standard abstracted format. In some implementations, the network request includes information about the network element such as a network element identifier, and/or type of network element. For example, a network request to configure a network device or system can include information indicating what network device or system is to be configured. At 320, a vendor adaptor is selected from a plurality of vendor adaptors based at least on information about the network element. For example, a network request to perform a configuration on a device can be received and information about the device can be used to select a vendor adaptor that can build network requests according to an acceptable format that can be accepted by the device provided by a vendor. In some implementations, the information about the network element can be included in the network request or derived from information included in the network request. At 330, using the vendor adaptor, a vendor-formatted network request is generated based at least on the received network request. For example, a selected vendor adaptor can be used to generate or build a network request according to a vendor format that can be processed or accepted by a network device that is compliant with the vendor format. In some implementations, the vendor adaptor transforms the received network request in the standard abstracted format into a vendor-formatted network request that can be accepted by a network device or system. In some implementations, the vendor adaptor builds a vendor-formatted network request compliant with one or more standards such as a version of MTOSI, TR-069, and/or other device compliant standards. At 340, the vendor-formatted network request is sent to the network element. For example, a vendor-formatted network request compliant with a standard that is accepted by or compliant with a network device can be sent to the device using one or more transport mechanisms. For example, an element adaptors layer of a unified network access layer can use a standard element adaptor or a custom adaptor to interface or communicate with a network element and/or OSS network facing component using the vendor-formatted network request and one or more transport mechanisms such as an XML based interface or a RPC based interface. In some implementations, the network element receives the vendor-formatted network request and performs an operation, configuration, or other function of the device. For example, based on information included in a vendor-formatted network request received from a unified network-access layer, a network element can perform a configuration, diagnostic, repair operation, or other functionality that the network element is capable of performing.

Exemplary Network-infrastructure Management Layer

Figure 4:
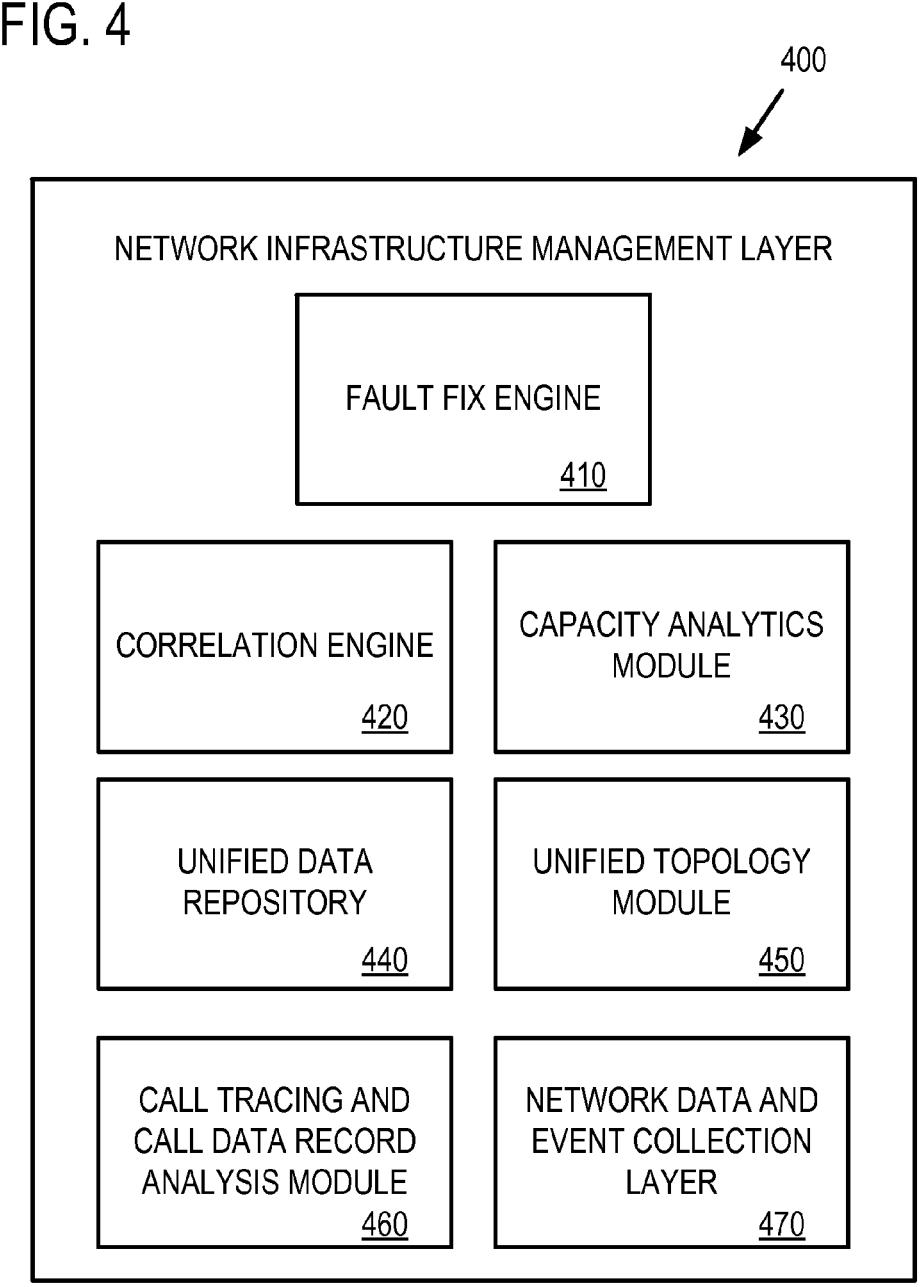
FIG. 4 is a schematic diagram illustrating an exemplary network-infrastructure management layer.

FIG. 4 is a schematic diagram illustrating an exemplary network-infrastructure management layer 400. The network-infrastructure management layer 400 includes a fault fix engine 410, a correlation engine 420, a capacity analytics module 430, a unified data repository 440, a unified topology module 450, a call tracing and call data record analysis module 460, and/or a network data and event collection layer 470. In some implementations, the network-infrastructure management layer can be coupled to a service management layer. In some implementations, the fault fix engine 410 can include and store self-recovery configurations for a plurality of network elements and systems. In some implementations, the self-recovery configurations can be used based on a diagnosis of a localized cause of a network failure by a service management layer. The self-recovery configurations can be information about repair procedures that can be performed to repair a network fault by performing a configuration or repair operation or function of a network device or system. The fault fix engine 410 can use logic to select a self-recovery configuration to perform from the plurality of self-recovery configurations based on a diagnosis from a service management layer. For example, if the service management layer diagnoses that a network fault or failure is caused by an improper configuration of a network system or device, then the fault fix engine can choose a self-recovery configuration that can correct or repair the improper configuration on the network device or system to properly configuring the network device or system. In some implementations, the fault fix engine can proactively auto correct network problems or faults by causing or requesting (e.g., via a network request) the performance of configurations or repair functions on other network devices based on monitored network element feeds such as traps. In some implementations, after fault identification and localization by the service management layer, the fault fix engine 410 can automatically repair and/or correct localized faults in part by initiating one or more repair operations. For example, the fault fix engine can cause the performance of a port flex and port reset to repair port or virtual local area network problems on an access network. Also for example, the fault fix engine can cause the performance of a line card reset to repair line card issues on an access network. In a further example, the fault fix engine can cause the performance of a port reset to repair port synchronization and/or no authentication problems for broadband services. In yet a further example, the fault fix engine can cause the performance of a session kill to repair and the removal of stale session problems for broadband services. Also for example, the fault fix engine can repair call server registration and/or configuration problems for voice services. Additionally for example, the fault fix engine can repair core network problems related to port configurations by causing the reconfiguration of ports. Also for example, the fault fix engine can cause the performance of modem force reboots and/or modem firmware upgrades for broadband services. In yet another example, the fault fix engine can repair speed problems for broadband services associated to a distribution point. The fault fix engine can automatically correct the network faults that occur over wired networks of communication service providers such as next generation networks. The fault fix engine can automatically correct faults that are identified and localized proactively in a proactive mode and/or reactively in a reactive mode. In some implementations, the fault fix engine can act on various traps and/or the fault fix engine can cause the performance of configurations on devices such as configuration of speeds in order to dynamically manage one or more speed profiles in the network. The fault fix engine 410 can have knowledge about the functionality and capabilities of network elements and can access information about the topology of the network from a unified topology module 450.

The correlation engine 420 can include rules that can determine root-cause events based on one or more received network events, and can correlate the information to determine an impact to the network. In some implementations, the correlation engine determines an impact across one or more domains of the network using a topology model. For example, if a network cable that connects two network devices fails, the generated alarms for the ports of the devices and an alarm for the cable failure can be collected and sent to the correlation engine, and the correlation engine can then determine from the three alarms that the root cause of the alarms is the cable failure and that the alarms for the ports were caused by the cable failure. In some implementations, the correlation engine can be used to reduce the number of alarms that are forwarded to other systems of the network. For example, using the information from the correlation engine, alarms and network events that are collected and determined not to be indicative of root causes of network problems or failures can be filtered out and not sent to other systems or used for further analysis by other layers. In some implementations, root cause information, network impact information determined, and/or information about network events is sent from the correlation engine to the service management layer which can determine and initiate the performance of a repair action.

The capacity analytics module 430 of the network-infrastructure management layer 400 can provide information, to other network systems and layers, about network capacity usage, reactive feeds from network elements, and/or proactive feeds from network elements. In some implementations, based on the information provided by the capacity analytics module, the fault fix engine can provide guided actions for configuration. In some implementations, the capacity analytics module can provide information regarding bandwidth capacity. For example, the fault fix engine can avoid bandwidth related issues to the end user through configurations like VP/VC moves using information provided by the capacity analytics module. The unified topology module 450 can include a topology model of the network. In some implementations, the topology model is logically constructed based on discovery of various network devices, components, and systems on the network. In one implementation, the logic of the network-infrastructure management layer can be implemented using rules and a rules engine.

Exemplary Service Management Layer

Figure 5:
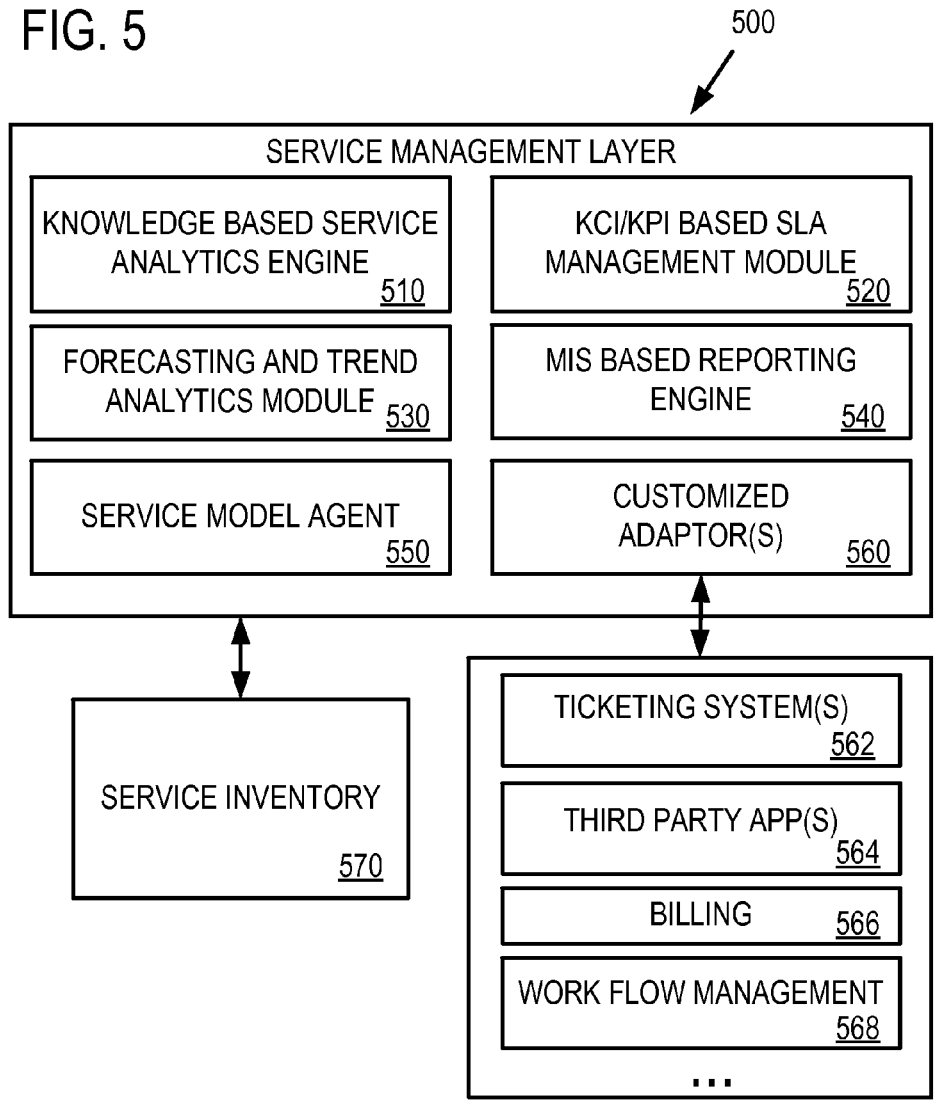
FIG. 5 is a schematic diagram illustrating an exemplary service management layer.

FIG. 5 is a schematic diagram illustrating an exemplary service management layer 500. The service management layer 500 can support multiple technologies and can be integrated with applications and/or components built across one or more platforms. The service management layer can include a knowledge based service analytics engine 510, a KCI/KPI based SLA management module 520, a forecasting and trend analytics module 530, a MIS based reporting engine 540, a service model agent 550, and/or one or more customized software adaptors 560.

The forecasting and trend analytics module 530 can perform network failure or fault localization in part by determining one or more root causes and location of the one or more root causes of a network failure or fault using forecasting and/or trend analytics. In one implementation, fault localization can be performed in part by collecting network feeds (e.g., alarms, traps, and/or network element diagnostic information), user reported problems with a network service, and/or other network information to be used with forecasting and trend analytics logic to determine one or more root causes of a network failure or fault. In some implementations, the fault localization is performed in part by localizing the service failure through associating the network service failure with one or more identified network devices, components, configurations, and/or systems experiencing problems that are causing the network service failure. In some implementations, the forecasting and trend analytics module 530, can perform fault localization and generate fault information that includes information about one or more causes of a service failure which can include an identifier and/or location on the network of a device, component, or service that is experiencing a problem that is causing a network service failure.

The knowledge based service analytics engine 510, in some implementations, can perform service impact analysis. For example, information about a network failure or fault (e.g., fault information) can be received and the knowledge based service analytics engine 510 can perform service impact analysis in part by associating the information about the network failure or fault with a service inventory of the network to determine how the network failure or fault will impact one or more network services and how the localized network failure is to be corrected or repaired. In some implementations of service impact analysis, the knowledge based service analytics engine 510 uses logic to determine if collected information such as requested network diagnostic information, network feeds (e.g., alarms, traps, and/or other network feeds), user reported network service problems, and/or fault information from a forecasting and trend analytics module indicate that there is a network failure that will impact network services. In some implementations, an artificial intelligence uses network information such as fault histories, fault resolutions, and network behavior patterns to aid the knowledge based service analytics engine 510 to diagnose and localize network faults. If the knowledge based service analytics engine 510 determines that a failure can adversely impact network services, the knowledge based service analytics engine 510 can determine the manner in which the failure is to be corrected. For example, the knowledge based service analytics engine can create a trouble ticket and/or initiate a manual or automatic correction of the network fault. That is to say the knowledge based service analytics engine can determine a route as to how the service impacting network failure is to be corrected or repaired. In some implementations, after the service impact analysis is performed, the knowledge based service analytics engine 510 can create a ticket indicating a fault (e.g., a network failure) in one or more trouble ticketing systems 562 for the network and the creation of the ticket can cause the performance of an automatic or manual correction of the fault. For example, information about a network service failure or fault can be sent from the knowledge based service analytics engine 562 to a fault fix engine of a network-infrastructure management layer as part of an automatic correction of a network fault or failure. In some implementations, the knowledge based service analytics engine can use a unified network-access layer to retrieve on-demand diagnostic information from network elements and systems, and, in some implementations, the on demand diagnostic information can be used to perform service impact analysis.

The KCI/KPI based SLA management module 520, can provide service-level agreement management based on key performance indicators and/or key control indicators. For example, key performance indicators can be monitored and provided to inform service-level agreement management. The MIS based reporting engine 540 provides reports based on parameters, and in some implementations, the parameters can be configured by an end user. The service management layer 500 can include one or more customized software adapters 560 to interface with one or more trouble ticketing systems 562 that can be different trouble ticketing systems with different interfaces. In some implementations, the service management layer can also include customized software adapters to integrate with one or more third party systems 564 across various domains, one or more billing systems 566, one or more workflow management systems 568, and/or other like network systems. For example, the service management layer 500 can interact with one or more billing systems using a customized software adaptor, and the interaction can effect or update billing systems based on the service impact analysis of the knowledge based service analytics engine 510. In some implementations, a service inventory 570 module can provide information about a service inventory to the service management layer 500. The service management layer 500 can include workflows and rules that can be integrated into one or more business rules engines.

The logic used by the service management layer 500, in some implementations, can be implemented using a rules engine. For example, the rules engine can be configured with one or more rules such as service rules for one or more services. In some implementations, the performance of the service rules are influenced by factors that can include a market type, a service offering, a class of service, technology limitations, noises in and/or out of an exchange (e.g., crosstalk, REIN, and/or SHINE) and other like service factors. In some implementations, the rules of the rules engine can be influenced by service factors such as fault domain areas for a service, pattern analysis of reactive and proactive tickets, service usage tends, service drop trends of an end user, and/or information provide from an infrastructure layer. By using the service rules influenced by service factors of the rules engine, the service management layer can provide a service based diagnostics for a communications network. In one implementation, the rules engine is a context based engine receiving and processing data from various network systems and initiating associated rule actions. In some implementations, the rules engine can include one or more rules, one or more rule sets, one or more actions and one or more workflows. In one implementation, a rule is applied to make a decision based on information collected and/or generated by the service management layer or a network-infrastructure management layer and the decision can cause a rule action to be performed. In one implementation, a rule set is a collection of rules which collectively implement a decision process. A rule action, in one implementation, can be an event that alters the state of a process when executed. A workflow, in one implementation, determines control logic to derive an end result that can be achieved using rules and rule sets. In some implementations, rules, workflows, and rule actions can be included in extensible markup language (XML) files that include syntax that can be dynamically loaded at run time using various features in underlying technologies. For example, if Java is being used JRebel can be used to dynamically load syntax from XML files at run time. In some implementations, a rules engine has an associated user interface layer that can be used to determine business rules for the rules engine. For example, using the user interface layer, a user can input business rules to be used by the rules engine. In some implementations, the user interface layer can be used to alter a workflow to cause an on-demand end result.

Exemplary Presentation Layer

Figure 6:
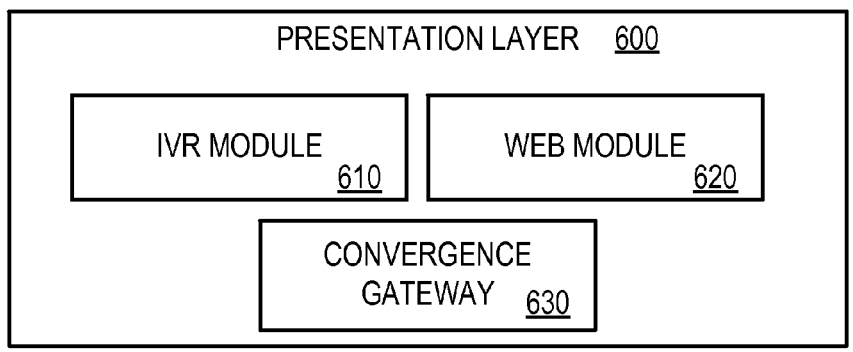
FIG. 6 is a schematic diagram illustrating an exemplary presentation layer.

FIG. 6 is a schematic diagram illustrating an exemplary presentation layer 600. The presentation layer 600 can provide a user interface to a user to interact with the services of a service management layer, a network-infrastructure management layer, and/or a unified network-access layer. In some implementations, the user interface is an interface that uses interactive voice response technologies (IVR), a web based interface, and/or a graphical user interface. For example, an end user of a service can report a problem with a service of the network or network failure using a graphical user interface of the presentation layer that can be accessible online. Also for example, a telecommunication agent can use a GUI of the presentation layer to handle network problems or failures of various services. The presentation layer 600 includes IVR module 610 which can allow integration with interactive voice response technologies using IVR software adapters. In some implementations, a presentation layer can be exposed through a B2B gateway which can enable service providers to integrate with their existing OSS systems, or the layer can be exposed with a common gateway. In some implementations, a presentation layer can allow integration with one or more enterprise portals using enterprise portal software adapters. The presentation layer 600 includes web module 620, and a convergence gateway 630. The web module 620 can provide a user interface of the presentation layer over the internet. In some implementations, the presentation layer 600 can provide an interface with one or more other technologies using the convergence gateway 630. In some implementations, the convergence gateway 630 can convert user interface information such as XML based user interface information to one or more other formats that can be accepted or compliant with one or more other technologies such as mobile applications and/or mobile devices.

Exemplary Method for Providing Network Service Assurance Proactively

Figure 7:
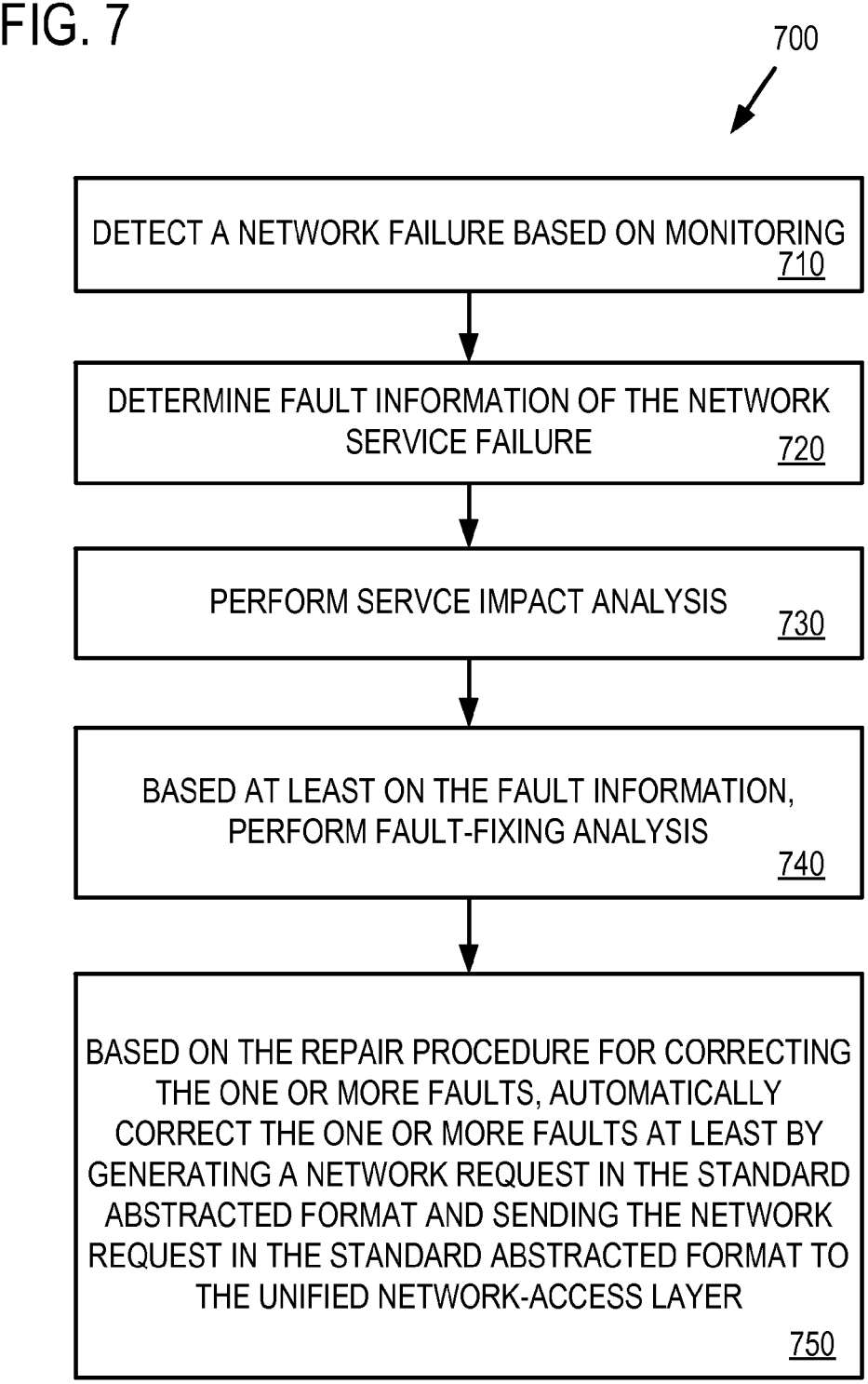
FIG. 7 is a flow diagram of an exemplary method for providing network service assurance proactively.

FIG. 7 is a flow diagram of an exemplary method for providing network service assurance proactively. In some implementations, proactive service assurance can aid in lowering the impact and the prevention of failures or outages on a communications network. In FIG. 7, a network failure is detected based on monitoring the network at 710. For example, a unified network-access layer can collect network data indicating one or more network failures (e.g., alarms and/or traps) by monitoring one or more network elements or systems of the network. At 720, fault information of the one or more network failures is determined. For example, the unified network-access layer can send the collected network data indicating the one or more network failures to the forecasting and trend analytics module of the service management layer to determine the cause of the network failure and the location of the network failure. In one implementation, the forecasting and trend analytics module determines the cause of the network failure using root cause analysis and a unified topology information from a unified topology module. In some implementations, fault information can include information about a cause and/or a location of a network failure. For example, the cause and location of a network failure can indicate identified network devices, components, or systems located on the network that are experiencing the problems that can contribute to a network service failure. In some implementations, after the cause and location of the network failure has been determined, a network data and event collection layer module stores the details of the fault information into a unified data repository and sends the fault information to a knowledge based service analytics engine for service impact analysis. At 730, service impact analysis is performed. For example, a knowledge based analytics engine can receive the fault information and can perform service impact analysis by associating the fault information with a service inventory to determine a localized network failure's impact on one or more network services and/or how the correction or repair of the network failure is to be handled. In some implementations, after the service impact analysis is performed, the knowledge based service analytics engine creates a ticket indicating a fault (e.g., a network failure) in a trouble ticketing system for the network and later or in parallel initiates an automatic correction of the network failure or fault using a fault fix engine. For example, the fault information can be sent from the knowledge based service analytics engine to the fault fix engine as part of the automatic correction of the fault. At 740, fault-fixing analysis is performed based at least on the fault information. For example, fault information can be received at a fault fix engine from a knowledge based service analytics engine and then the fault fix engine can extract the necessary data from the fault information to perform fault analysis. In some implementations of fault analysis, the fault fix engine is configured with decision making rules and diagnostic tools that are used to decide what repair procedure is to be used to correct and/or repair a fault on the network. For example, if the fault is determined to be a fault that is on a list of faults that can be automatically corrected, then the fault fix engine proceeds to automatically correct the fault using at least one repair operation. In some implementations, if the fault is not determined to be an automatically correctable fault, manual task information is generated so that the fault can be corrected or repaired manually. At 750, based on a repair procedure for correcting the one or more faults, the one or more faults are automatically corrected at least by generating a network request in a standard abstracted format and sending the network request in the standard abstracted format to the unified network-access layer. For example, a repair operation of a selected repair procedure can be initiated at least by generating a network request according to a standard abstracted format that can cause the repair operation to be performed at one or more network elements, and the generated network request can be sent to the unified network-access layer to be processed and transformed into a vendor-formatted network request that is transmitted to one or more network elements that can perform the repair operation. In some implementations, after the performance of at least one repair operation, testing is performed, at least using the fault fix engine, to determine that one or more faults are corrected or that the one or more faults are not corrected. In some implementations of proactive service assurance, key performance indicator reports can be sent to a service user or customer based on a class of service for the customer or user.

Exemplary Method for Providing Network Service Assurance Reactively

Figure 8:
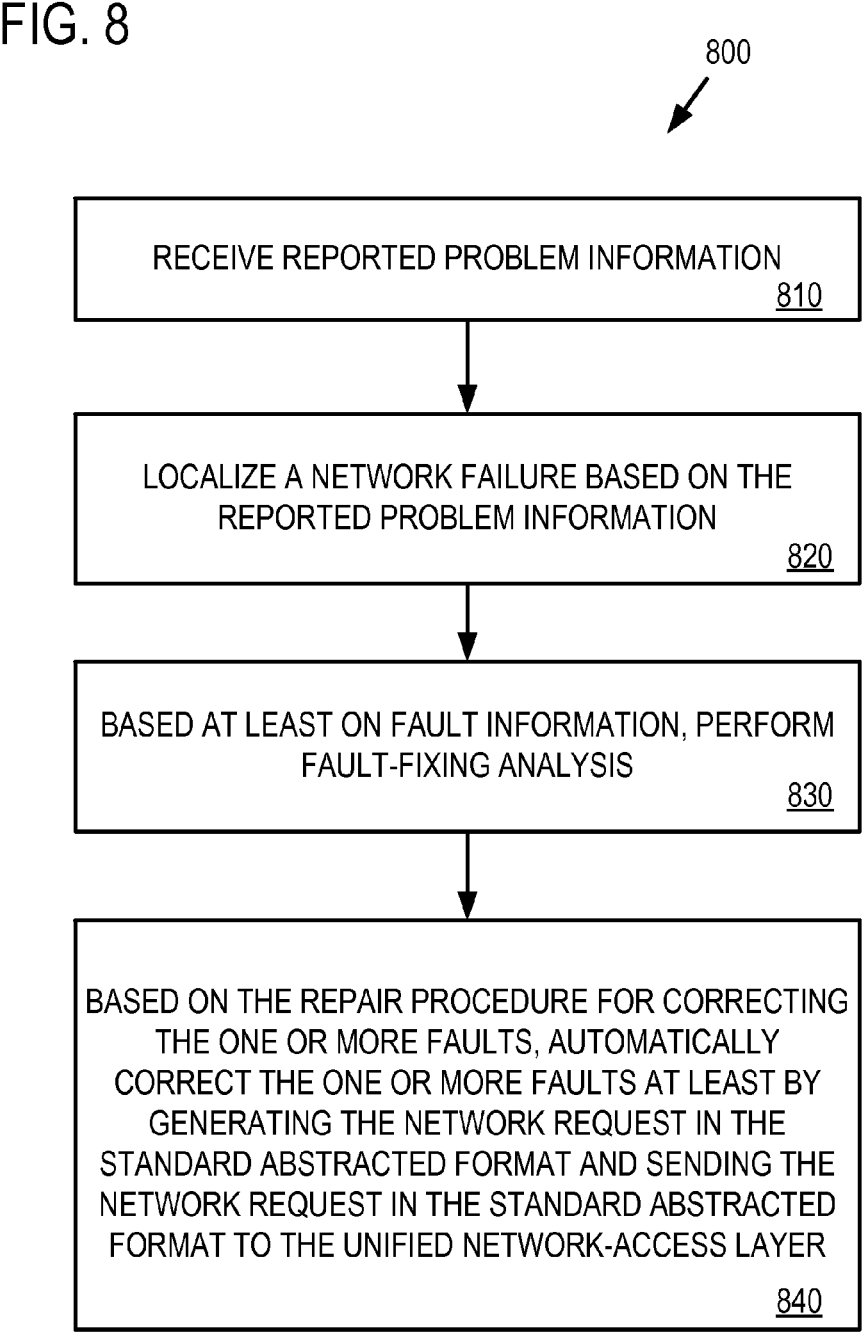
FIG. 8 is a flow diagram of an exemplary method for providing network service assurance reactively.

FIG. 8 is a flow diagram of an exemplary method 800 for providing network service assurance reactively. In the figure at 810, reported problem information is received. For example, a customer or user of services provided by a communications service provider reports one or more network or network service problems or failures to the communication service provider, and the reported problem information is sent to and received by a knowledge based service analytic engine of a service management layer. At 820, a network failure is localized based on the reported problem information and fault information is created for the localized network service failure. For example, the knowledge based service analytics engine of a service management layer can perform diagnostics based on the reported problem information and can use a forecasting and trend analytics module to localize the network failure, and the information about the localized network failure can be used to produce fault information. In some implementations, the knowledge based service analytics engine retrieves inventory information from a service inventory repository as part of the diagnostics. In some implementations, the knowledge based service analytics engine performs diagnostics in part by retrieving diagnostics from different OSS systems to determine faults that have been previously detected and that are known faults on the network. In some implementations, the knowledge based service analytics engine performs diagnostics in part by retrieving real time diagnostics collected from network elements and that are exposed and available from a unified network access layer. In some implementations, the knowledge based service analytics engine can use the unified network access layer to perform tests in order to localize a fault across the network by interfacing with one or more types of test heads and/or probes to determine, in real time or one-demand, one or more quality of service parameters such as jitter, latency, and other parameters. In some implementations, the knowledge based service analytics engine stores the fault information generated from the diagnostics in a unified data repository and/or creates a ticket indicating a fault (e.g., a network failure), in a trouble ticketing system, that can initiate an automatic correction or repair of the fault using a fault fix engine.

At 830 fault-fixing analysis is performed based at least on the fault information. For example, fault information can be received at a fault fix engine from a knowledge based service analytics engine and then the fault fix engine can extract the necessary data from the fault information to perform fault analysis. In some implementations of fault analysis, the fault fix engine is configured with decision making rules and diagnostic tools that are used to decide what repair procedure is to be used to correct and/or repair a fault on the network. For example, the fault fix engine can select and/or use one or more self-repair configurations to determine a repair procedure to decide what repair procedure is to be used to correct and/or repair a fault on the network. At 840, based on a repair procedure for correcting the one or more faults, the one or more faults are automatically corrected at least by generating a network request in the standard abstracted format and sending the network request in the standard abstracted format to the unified network-access layer. For example, a repair operation of a selected repair procedure can be initiated at least by generating a network request according to a standard abstracted format that can cause the repair operation to be performed at one or more network elements, and the generated network request can be sent to the unified network-access layer to be processed and transformed into a vendor-formatted network request that is transmitted to one or more network elements that can perform the repair operation.

Figure 9:
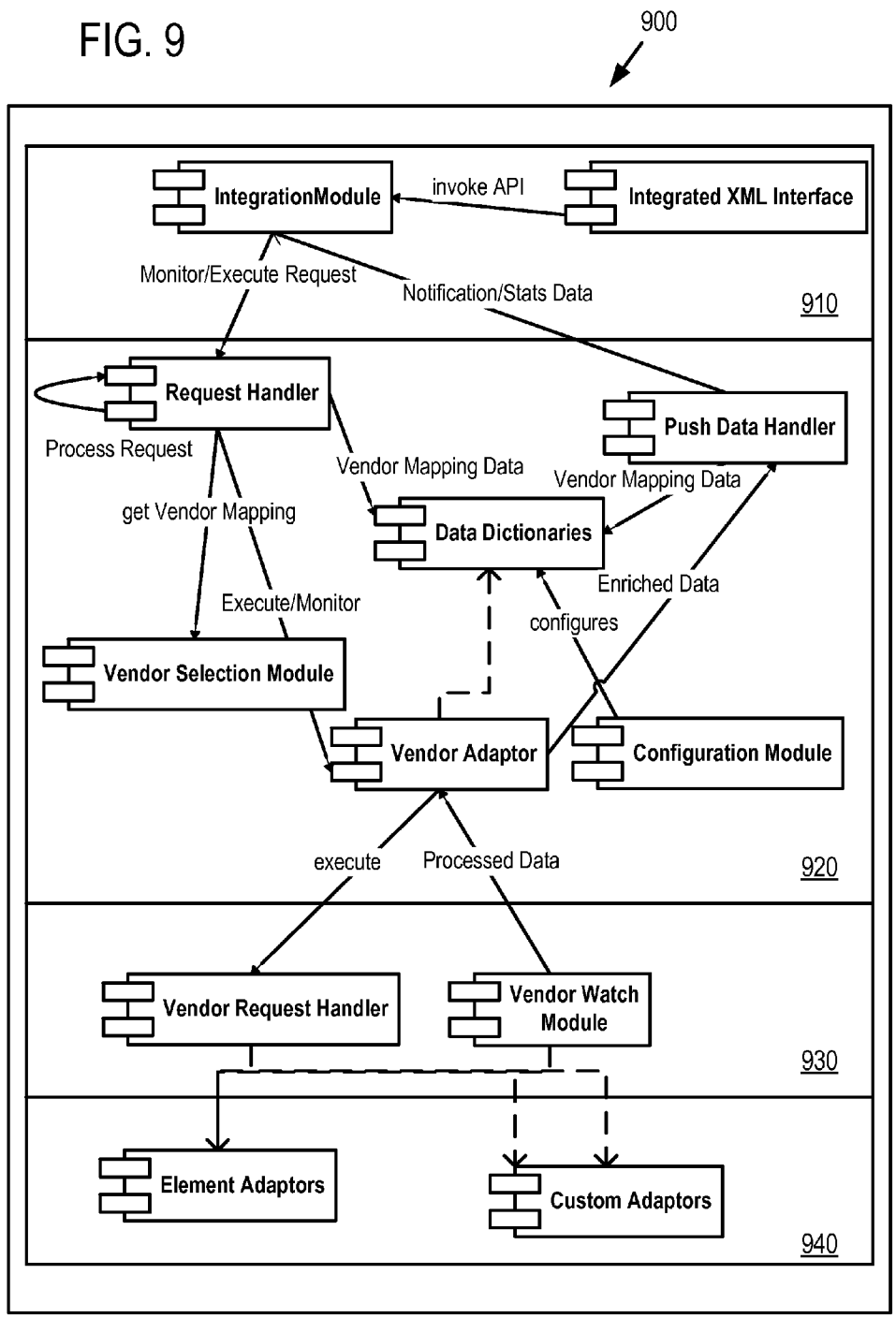
FIG. 9 is a schematic diagram illustrating an exemplary unified network-access layer.

FIG. 9 is a schematic diagram illustrating an exemplary unified network-access layer 900. The unified network-access layer 900 includes an integration layer 910, a data modeling layer 920, a network adaptation layer 930, and an element adaptors layer 940.

Exemplary Computing Environment

FIG. 10 illustrates a generalized example of a suitable computing environment 1000 in which herein described embodiments, techniques, solutions, and technologies may be implemented. The computing environment 1000 is not intended to suggest any limitation as to scope of use or functionality of the technology, as the technology may be implemented in diverse general-purpose or special-purpose computing environments. For example, the disclosed technology may be implemented using one or more computing devices comprising a processing unit, memory, and storage storing computer-executable instructions implementing the technologies described herein. For example, computing devices include server computers, desktop computers, laptop computers, notebook computers, netbooks, tablet computers, mobile devices, PDA devices and other types of computing devices (e.g., devices such as televisions, media players, or other types of entertainment devices that comprise computing capabilities such as audio/video streaming capabilities and/or network access capabilities). The disclosed technology may also be implemented with other computer system configurations, including hand held devices, multiprocessor systems, microprocessor-based or programmable consumer electronics, network PCs, minicomputers, mainframe computers, a collection of client/server systems, or the like. The disclosed technology may also be practiced in distributed computing environments where tasks are performed by remote processing devices that are linked through a communications network (e.g., a local network, non-local network, and/or the Internet). In a distributed computing environment, program modules may be located in both local and remote memory storage devices. Additionally, the techniques, technologies, and solutions described herein can be performed in a cloud computing environment (e.g., comprising virtual machines and underlying infrastructure resources).

With reference to FIG. 10, the computing environment 1000 includes at least one central processing unit 1010 and memory 1020. In FIG. 10, this basic configuration 1030 is included within a dashed line. The central processing unit 1010 executes computer-executable instructions. In a multi-processing system, multiple processing units execute computer-executable instructions to increase processing power and as such, multiple processors can be running simultaneously. The memory 1020 may be volatile memory (e.g., registers, cache, RAM), non-volatile memory (e.g., ROM, EEPROM, flash memory, etc.), or some combination of the two. The memory 1020 stores software 1080 that can, for example, implement one or more of the technologies described herein. A computing environment may have additional features. For example, the computing environment 1000 includes storage 1040, one or more input devices 1050, one or more output devices 1060, and one or more communication connections 1070. An interconnection mechanism (not shown) such as a bus, a controller, or a network, interconnects the components of the computing environment 1000. Typically, operating system software (not shown) provides an operating environment for other software executing in the computing environment 1000, and coordinates activities of the components of the computing environment 1000.

The storage 1040 may be removable or non-removable, and includes magnetic disks, magnetic tapes or cassettes, CD-ROMs, CD-RWs, DVDs, or any other tangible storage medium which can be used to store information and which can be accessed within the computing environment 1000. The storage 1040 stores computer-executable instructions for the software 1080, which can implement technologies described herein.

The input device(s) 1050 may be a touch input device, such as a keyboard, keypad, mouse, touch screen, controller, pen, or trackball, a voice input device, a scanning device, or another device, that provides input to the computing environment 1000. For audio, the input device(s) 1050 may be a sound card or similar device that accepts audio input in analog or digital form, or a CD-ROM reader that provides audio samples to the computing environment 1000. The output device(s) 1060 may be a display, printer, speaker, CD-writer, DVD-writer, or another device that provides output from the computing environment 1000.

The communication connection(s) 1070 enable communication over a communication medium (e.g., a connecting network) to another computing entity. The communication medium conveys information such as computer-executable instructions, compressed graphics information, compressed or uncompressed video information, or other data in a modulated data signal.

Further Considerations

Any of the disclosed methods can be implemented using computer-executable instructions stored on one or more computer-readable media (tangible computer-readable storage media, such as one or more optical media discs, volatile memory components (such as DRAM or SRAM), or nonvolatile memory components (such as hard drives)) and executed on a computing device (e.g., any commercially available computer, including smart phones or other mobile devices that include computing hardware). By way of example, computer-readable media include memory 1020 and/or storage 1040. As should be readily understood, the term computer-readable media does not include communication connections (e.g., 1070) such as modulated data signals.

Any of the computer-executable instructions for implementing the disclosed techniques as well as any data created and used during implementation of the disclosed embodiments can be stored on one or more computer-readable media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to a particular type of hardware. Certain details of suitable computers and hardware are well known and need not be set forth in detail in this disclosure.

Furthermore, any of the software-based embodiments (comprising, for example, computer-executable instructions for causing a computing device to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims and their equivalents. We therefore claim as our invention all that comes within the scope of these claims and their equivalents.

We claim:

1. A system comprising one or more computing devices implementing an integrated end-to-end framework for network service assurance, the system comprising:
   one or more processors; and
   memory, the memory storing computer-executable instructions for causing the system to implement the framework comprising:
      a presentation layer;
      a service management layer;
      a network-infrastructure management layer; and
      a unified network-access layer, the unified network-access layer configured to:
         receive a network request in a standard abstracted format, the network request associated with at least one network element of a plurality of network elements;
         based on information about the at least one network element, select a vendor adaptor from a plurality of vendor adaptors;
         using the vendor adaptor, generate a vendor-formatted network request based at least on the received network request; and
         send the vendor-formatted network request to the at least one network element.

2. The system implementing the integrated end-to-end framework of claim 1 wherein the vendor adaptor transforms the network request in the standard abstracted format into the vendor-formatted network request in a vendor format.

3. The system implementing the integrated end-to-end framework of claim 2 wherein the vendor adaptor transforms the network request in the standard abstracted format into the vendor-formatted network request at least by mapping an identified device with a device interface standard compliant with the device and generating the vendor-formatted network request so that it is compliant with the device interface standard.

4. The system implementing the integrated end-to-end framework of claim 1 wherein the network-infrastructure management layer comprises a fault fix engine, a correlation engine, a capacity analytics module, a unified topology module, a call tracing and call data record analysis module, and a unified data repository.

5. The system implementing the integrated end-to-end framework of claim 1 wherein the service management layer comprises a management information system based reporting engine, a knowledge based service analytics engine, a key indicators based service level agreement management module, a forecasting and trend analytics module, and a service model agent module.

6. The system implementing the integrated end-to-end framework of claim 1 wherein the service management layer comprises a knowledge based service analytics engine, the knowledge based service analytics engine comprising a rules engine.

7. The system implementing the integrated end-to-end framework of claim 1 wherein the presentation layer comprises an interactive voice response module, a web module, or a convergence gateway.

8. The system implementing the integrated end-to-end framework of claim 1 wherein the service management layer comprises one or more third-party adaptors that interface with one or more external systems, the external systems comprising a trouble ticketing system, a workflow management system, or a billing system.

9. The system implementing the integrated end-to-end framework of claim 1 wherein the unified network-access layer comprises an integration layer, the integration layer comprising an integration web service module and an integration module.

10. The system implementing the integrated end-to-end framework of claim 1 wherein the unified network-access layer comprises an integration layer, a data modeling layer, a network adaptation layer, and an element adaptors layer.

11. The system implementing the integrated end-to-end framework of claim 1 wherein the unified network-access layer comprises a data modeling layer, the data modeling layer configured to transform network requests in a standard abstracted format into a plurality of vendor formats using at least one or more data dictionaries.

12. The system implementing the integrated end-to-end framework of claim 1 wherein the unified network-access layer comprises a network adaptation layer, the network adaptation layer configured to operate in a reactive mode at least using one or more vendor request handlers or in a proactive mode using at least one or more vendor watch modules.

13. A method for providing an integrated end-to-end framework for network service assurance implemented using one or more computing devices, the method comprising:
   providing a presentation layer;
   providing a service management layer;
   providing a network-infrastructure management layer; and
   providing a unified network-access layer, the unified network-access layer configured to:
      receive a network request in a standard abstracted format, the network request associated with at least one network element of a plurality of network elements;

based on information about the at least one network element, select a vendor adaptor from a plurality of vendor adaptors;

using the vendor adaptor, generate a vendor-formatted network request based at least on the received network request; and send the vendor-formatted network request to the at least one network element.

14. The method of claim 13 wherein the vendor adaptor transforms the network request in the standard abstracted format into the vendor-formatted network request in a vendor format.

15. The method of claim 14 wherein the vendor adaptor transforms the network request in the standard abstracted format into the vendor-formatted network request at least by mapping an identified device with a device interface standard compliant with the device and generating the vendor-formatted network request so that it is compliant with the device interface standard.

16. The method of claim 13 wherein the network-infrastructure management layer comprises a fault fix engine, a correlation engine, a capacity analytics module, a unified topology module, a call tracing and call data record analysis module, and a unified data repository.

17. The method of claim 13 wherein the service management layer comprises a management information system based reporting engine, a knowledge based service analytics engine, a key indicators based service level agreement management module, a forecasting and trend analytics module, and a service model agent module.

18. The method of claim 13 wherein the service management layer comprises a knowledge based service analytics engine, the knowledge based service analytics engine comprising a rules engine.

19. The method of claim 13 wherein the presentation layer comprises an interactive voice response module, a web module, or a convergence gateway.

20. One or more non-transitory computer-readable media storing computer-executable instructions for causing one or more computing devices to perform a method for providing an integrated end-to-end framework for network service assurance, the method comprising:

providing a presentation layer;

providing a service management layer;

providing a network-infrastructure management layer; and providing a unified network-access layer, the unified network-access layer configured to:

receive a network request in a standard abstracted format, the network request associated with at least one network element of a plurality of network elements;

based on information about the at least one network element, select a vendor adaptor from a plurality of vendor adaptors;

using the vendor adaptor, generate a vendor-formatted network request based at least on the received network request; and send the vendor-formatted network request to the at least one network element.

* * * * *